United States Patent
Schmider et al.

(10) Patent No.: US 10,800,957 B2
(45) Date of Patent: Oct. 13, 2020

(54) POLYURETHANE HOT MELT ADHESIVE BASED ON POLYACRYLATES WITH HIGH HEAT RESISTANCE

(71) Applicant: SIKA TECHNOLOGY AG, Baar (CH)

(72) Inventors: Martin Schmider, Hamburg (DE); Kai Paschkowski, Jork (DE); Jörg Plaumann, Hamburg (DE)

(73) Assignee: SIKA TECHNOLOGY AG, Baar (CH)

( * ) Notice: Subject to any disclaimer, the term of this patent is extended or adjusted under 35 U.S.C. 154(b) by 49 days.

(21) Appl. No.: 15/781,685

(22) PCT Filed: Dec. 21, 2016

(86) PCT No.: PCT/EP2016/082049
§ 371 (c)(1),
(2) Date: Jun. 5, 2018

(87) PCT Pub. No.: WO2017/108873
PCT Pub. Date: Jun. 29, 2017

(65) Prior Publication Data
US 2018/0346775 A1    Dec. 6, 2018

(30) Foreign Application Priority Data

Dec. 23, 2015   (EP) .................................... 15202474

(51) Int. Cl.
| | | |
|---|---|---|
| *C09J 175/06* | (2006.01) | |
| *C08G 18/48* | (2006.01) | |
| *C08G 18/76* | (2006.01) | |
| *C08G 18/42* | (2006.01) | |
| *C08G 18/40* | (2006.01) | |
| *C09J 175/04* | (2006.01) | |
| *C08K 3/34* | (2006.01) | |
| *C08L 33/12* | (2006.01) | |
| *C09J 5/06* | (2006.01) | |
| *C09J 175/08* | (2006.01) | |
| *C08K 3/04* | (2006.01) | |
| *C08K 3/36* | (2006.01) | |

(52) U.S. Cl.
CPC ........ *C09J 175/06* (2013.01); *C08G 18/4018* (2013.01); *C08G 18/42* (2013.01); *C08G 18/4825* (2013.01); *C08G 18/7671* (2013.01); *C08K 3/34* (2013.01); *C08L 33/12* (2013.01); *C09J 5/06* (2013.01); *C09J 175/04* (2013.01); *C09J 175/08* (2013.01); *C08G 2170/20* (2013.01); *C08K 3/04* (2013.01); *C08K 3/346* (2013.01); *C08K 3/36* (2013.01); *C09J 2205/102* (2013.01)

(58) Field of Classification Search
CPC ....................................................... C09J 175/06
See application file for complete search history.

(56) References Cited

U.S. PATENT DOCUMENTS

| | | |
|---|---|---|
| 5,869,593 A | 2/1999 | Helmeke et al. |
| 2013/0020025 A1 | 1/2013 | Li et al. |

FOREIGN PATENT DOCUMENTS

| | | | | |
|---|---|---|---|---|
| CN | 102477273 | A | 5/2012 | |
| CN | 103087666 | A | 5/2013 | |
| CN | 103865465 | A | 6/2014 | |
| EP | 0 776 342 | B1 | 9/1998 | |
| EP | 1 036 103 | B2 | 7/2008 | |
| EP | 1036103 | B2 * | 7/2008 | .......... C08L 2666/18 |
| JP | 2003-226849 | A | 8/2003 | |
| WO | 99/28363 | A1 | 6/1999 | |

OTHER PUBLICATIONS

"Polyacryl- und Polymethacryl-Verbindungen," Ullmann's Enzyklopädie der technischen Chemie, Verlag Chemie, 4th Edition, vol. 19, pp. 7-30.
Mar. 7, 2017 International Search Report issued in International Patent Application No. PCT/EP2016/082049.
Jun. 26, 2018 International Preliminary Report on Patentability issued in International Patent Application No. PCT/EP2016/082049.
Jul. 24, 2020 Office Action issued in Chinese Patent Application No. 201680075050.3.
Jul. 17, 2020 Office Action issued in European Patent Application No. 16820249.7.

* cited by examiner

*Primary Examiner* — Daniel H Lee
(74) *Attorney, Agent, or Firm* — Oliff PLC

(57) ABSTRACT

Solvent-free polyurethane hot melt adhesives which can be obtained by reacting a composition including a polyether polyol, a polyester polyol, at least one poly(meth)acrylate, and one or more fillers, selected from kaolin, fumed silica, soot, and wollastonite, with a polyisocyanate. In comparison to similar adhesives without a filler content, the adhesives are characterized by significantly improved heat resistance properties while the remaining properties are comparable. Furthermore, in some cases, improved mechanical properties, such as an improved tear strength, could be observed by adding the fillers. The aforementioned hot melt adhesive compositions are therefore suitable in particular for applications in automotive construction, in the textile industry, and in the packaging industry, and in particular for adhering sandwich panels.

18 Claims, No Drawings

POLYURETHANE HOT MELT ADHESIVE BASED ON POLYACRYLATES WITH HIGH HEAT RESISTANCE

DESCRIPTION

Technical Field

The invention pertains to the field of polyurethane hot melt adhesives (PU-RHMs).

Reactive polyurethane compositions which can be used as hot melt adhesives have been known for a long time (PU-RHM=reactive hotmelt). They consist usually of diisocyanate-terminated polyurethane prepolymers which are obtained by reacting suitable polyols with an excess of diisocyanates. Immediately after their application, adhesives of this kind cool and, in so doing, develop a high initial strength, and acquire their ultimate properties, in particular their heat stability and resistance to environmental effects, through the gradual process of "curing", i.e., the chemical reaction of the isocyanate groups with atmospheric moisture.

One problem of presently known PU-RHMs which are based, for example, on combinations of polyether polyols and polyester polyols and also polyacrylates is that the heat stabilities of such adhesives are low, being situated, for example, in the range from 150 to 170° C. This low heat resistance by comparison with compositions without polyacrylates is attributable to the substantial fraction of polyacrylates in the compositions in question, these polyacrylates being needed for different properties that are desired for the adhesive.

Polyacrylate-containing polyurethane adhesives are used in numerous sectors of industry, as for example in the bonding of sandwich panels. For these applications it would be desirable to have a hot melt adhesive possessing not only the favorable properties for the PU-RHMs with polyacrylate constituents but also improved heat resistance and, usefully, improved mechanical properties as well.

Prior Art

In the prior art there are some descriptions of polyurethane hot melt adhesive systems whose constituents include fillers. Thus, for example, CN 103865465A describes a moisture-curable polyurethane hot melt adhesive for automobile lamps. The polyurethane hot melt adhesives described in CN 103865465A contain 15% to 25% of diphenylmethane diisocyanate (MDI), 25% to 35% of a highly crystalline polyester polyol, 12.5% to 17.5% of an aromatic polyester polyol, and 12.5% to 17.5% of a non-crystalline polyester polyol, 5% to 15% of a tackifying resin, 5% to 10% of a filler, and 0.02% to 0.1% of a catalyst. The polyurethane hot melt adhesives of CN 103865465A are said to have the advantages of particularly favorable initial bonding strength, adjustable open time and melt viscosity, and also excellent resistance capacity at high and low temperatures.

JP 2003-226849 describes hot melt adhesive sheets for electronic components, based essentially on a crystalline polyurethane resin having a softening temperature in the range from 50 to 90° C., a saturated polyester resin having a glass transition temperature Tg in the range from 0 to 110° C., and a filler. The filler may be incorporated with 20 to 200 parts, relative to 100 parts of the crystalline polyurethane resin and 5 to 120 parts of the saturated polyester, into the composition.

CN 103087666 describes polyurethane sealing materials which contain 60 to 90 parts of a polyurethane prepolymer, 0 to 20 parts of a filler, 0.3 to 1.0 part of a silane adhesion promoter, 0.2 to 0.9 part of a catalyst, and 5 to 20 parts of a thermoplastic polymer. The specified sealing agent is said to have the advantages of particularly favorable attachment strength and a significantly reduced latency time, with beneficial consequences for the efficacy of production.

EP 0 776 342 relates to reactive hot melt adhesives which comprise a filler, thus making it possible, among other things, to formulate for improved workability, wettability, and improved curing profile times.

CN 102477273 describes a method for producing polyurethane hot melt adhesives which are based on 50 to 70 wt % of a polyacrylic-polymethylene isocyanate, 20 to 30 wt % of a crystalline polymer polyol, 1 to 2 wt % of a blocking agent, 5 to 15 wt % of a tackifying resin and 5 to 10 wt % of a filler. The adhesives described are said to have the advantage of particularly favorable initial and ultimate strengths and also low coating temperatures and melt viscosities.

EP 1 036 103 describes substantially solvent-free polyurethane hot melt adhesives which are produced from (i) 95 to 3 wt % of a product of reaction of a polyisocyanate and a polymer with low molecular weight based on ethylenically unsaturated monomers, said polymer having active hydrogen groups; (ii) 5 to 90 wt % of at least one polyurethane prepolymer having free isocyanate groups, this polymer being obtainable from the reaction of a polyol selected from the group consisting of polyether diols, polyether triols, polyester polyols, and mixtures thereof, with at least one polyisocyanate; and (iii) 0 to 40 wt % of adjuvants selected from the group consisting of tackifying resins, plasticizers, fillers, pigments, stabilizers, tack improvers, and mixtures thereof.

In contrast to polyacrylate-containing PU-RHMs, however, the adhesives referred to above do not have properties required, for example, for the bonding of sandwich elements.

U.S. Pat. No. 5,869,593 discloses polyurethane hot melt adhesives which are based on polyethers, polyesters, and polyisocyanates. The hot melt adhesives may further comprise a thermoplastic polymer component comprising polyurethane, EVA copolymers, ethylene-acrylate copolymers or acrylate copolymers, and also a filler which is selected from materials such as talc, clays, silica, carbon black, and mica. The adhesives and sealants that are described in U.S. Pat. No. 5,869,593 are said to be distinguished by very high water vapor transmission.

US 2013/020025 A1 describes silane moisture-curing hot melt adhesives which are based on polyurethanes functionalized with silanes. The polyurethane on which the hot melt adhesive of 2013/020025 A1 is based is prepared from polyols, hydroxy-functionalized acrylates, and a deficit amount of polyisocyanates, based on the NCO/OH ratio, so that subsequent functionalization with an isocyanatosilane is possible. The ultimate curing in the context of US 2013/020025 A1 derives from the hydrolysis and subsequent condensation of silane alkoxide groups.

It is an object of the present invention, therefore, to propose a polyurethane hot melt adhesive which unites the advantageous properties of the polyacrylate-containing polyurethane hot melt adhesives with improved heat propriety properties and possibly improved mechanical properties.

SUMMARY OF THE INVENTION

Surprisingly it has been found that this object can be achieved by compositions which correspond to the known polyacrylate-containing polyurethane hot melt adhesives and which additionally comprise a filler selected from the group encompassing kaolin, fumed silica, carbon black, and wollastonite. The invention accordingly relates to a solvent-free polyurethane hot melt adhesive which is obtainable by the reaction of a composition comprising a polyether polyol, a polyester polyol, at least one polyacrylate, and one or more fillers selected from kaolin, fumed silica, carbon black or wollastonite, with a polyisocyanate. Such hot melt adhesives are distinguished by significantly improved heat stabilities in comparison to corresponding adhesives without fillers, and also exhibit sufficient stability on storage at elevated temperatures. This distinguishes the fillers referred to in the context of the present invention from fillers, such as mica, nanoclay, chalk or talc, for example, for which, while it has been possible also to observe an improvement in the heat resistance, it is nevertheless the case that they detract from the thermal stability of the adhesive systems, so that these systems cure even in the absence of moisture.

Further aspects of the invention relate to a method for bonding with the stated hot melt adhesive, and also to articles obtained by this method and to the use of the polyurethane hot melt adhesives of the invention for specific applications. Preferred embodiments are subjects of the dependent claims.

CERTAIN EMBODIMENTS OF THE INVENTION

The prefix "poly" in substance designations such as "polyol" or "polyisocyanate" relates to substances which in formal terms contain two or more per molecule of the functional group occurring in their designation. A polyol, for example, is a compound having two or more hydroxyl groups, and a polyisocyanate is a compound having two or more isocyanate groups.

A prepolymer is a polymer which contains at least one, commonly two or more, reactive group(s), e.g., isocyanate groups. By way of the reactive groups it is possible for the prepolymer to be chain-extended, crosslinked or cured.

Starting components are understood here to refer below to the polyether polyols, polyisocyanates, polyester polyols, and poly(meth)acrylates that are used in preparing the polyurethane hot melt adhesive, and also to the fillers that are mentioned. This relates in particular to the quantity figures given hereinafter.

The average molecular weight refers here to the numerical average of the molecular weight Mn, which is determined by GPC analysis (gel permeation chromatography) relative to suitable polystyrene standards.

By "solvent-free" is meant, in the context of the present invention, a fraction of compounds that are inert toward polyisocyanates or polyols, and have a boiling temperature below 200° C., of less than 2 wt %, preferably less than 1 wt %, and more preferably less than 0.5 wt %. It is most preferable if no solvents are added to the solvent-free polyurethane hot melt adhesive of the invention, apart from any impurities present in the starting materials.

Generally it is the case for the polyols specified below that they preferably have an average molecular weight Mn of at least 400 g/mol and preferably at least 1000 g/mol. Particularly suitable average molecular weights are in the range from 400 to 30 000 g/mol and preferably 1000 to 8000 g/mol.

Included in the production of the solvent-free polyurethane hot melt adhesive according to the present invention is a polyether polyol; it is also possible, however, for a plurality of polyether polyols to be employed. The polyether polyols are, for example, diols or triols or mixtures thereof. With particular preference the polyether polyol is a polyether diol. Polyether polyols are available commercially.

The polyether polyol, furthermore, is usefully a polyoxyalkylene polyol. Particularly suitable polyoxyalkylene polyols are, for example, products of polymerization of ethylene oxide, 1,2-propylene oxide, 1,2- or 2,3-butylene oxide, tetrahydrofuran or mixtures thereof, optionally polymerized with the aid of a starter molecule having two or more active hydrogen atoms such as, for example, water, ammonia or compounds having two or more OH or NH groups such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrated bisphenol A, 1,1,1-tri-methylolethane, 1,1,1-trimethylolpropane, glycerol, aniline, and also mixtures of the aforesaid compounds. Use may be made both of polyoxyalkylene polyols which have a low degree of unsaturation (measured according to ASTM D-2849-69 and specified in milliequivalents of unsaturation per gram of polyol (meq/g)), prepared for example with the aid of what are called double metal cyanide complex catalysts (DMC catalysts), and of polyoxyalkylene polyols having a higher degree of unsaturation, produced for example with the aid of anionic catalysts such as NaOH, KOH or alkali metal alkoxides.

The polyether polyol is preferably a polyoxyethylene diol, polyoxyethylene triol, polyoxypropylene diol, polyoxypropylene triol, or a mixture thereof. The polyether polyol is more preferably a polyethylene oxide and/or a polypropylene oxide. Most preferably the polyether polyol is polypropylene oxide. Such polyether polyols are sold under the tradename Acclaim® from Bayer, for example. Likewise suitable are what are called ethylene oxide-endcapped ("EO-endcapped" polyoxypropylene diols or triols. These are polyoxypropylene-polyoxyethylene polyols which are obtained, for example, by alkoxylating polyoxypropylene polyols, after the end of the polyprop-oxylation, with ethylene oxide and which consequently have primary hydroxyl groups. The polyether polyol, and also the aforesaid preferred polyether polyols, especially polypropylene oxide, have for example an average molecular weight in the range from 400 to 30 000 g/mol, preferably from 1000 to 8000 g/mol, and more preferably from 1000 to 4000 g/mol.

The polyether polyol is usefully incorporated with a content in the range from 15 to 45 wt % and preferably 20 to 40 wt %, based on the total weight of the starting components, into the polyurethane hot melt adhesive of the invention. It is preferred, moreover, if the solvent-free polyurethane hot melt adhesive of the invention includes only one polyether polyol.

Additionally incorporated into the solvent-free polyurethane hot melt adhesives of the invention is a polyester polyol; this, however, may also comprise two or more polyester polyols.

Suitable polyester polyols are liquid, amorphous or crystalline polyester polyols, such as polyester triols and especially polyester diols, and mixtures of these polyester polyols; the polyester polyol is preferably a crystalline polyester polyol. The division into liquid, amorphous, and crystalline polyester polyols is customary and known to the person skilled in the art. Corresponding products are available commercially, examples being the Dynacoll®7000 series from Evonik.

The liquid polyester polyols have a glass transition temperature of below 0° C., preferably −5° C. or below. The amorphous polyester polyols have a glass transition temperature of at least 0° C. The crystalline polyester polyols possess a melting point, and the melting point is preferably at least 35° C., more preferably at least 50° C. The glass transition temperature (Tg) and the melting point (m.p.) can be determined in accordance with DIN 53765.

Suitable polyester polyols are for example prepared from di- or trihydric, preferably dihydric, alcohols, such as, for example, 1,2-ethanediol, diethylene glycol, triethylene glycol, 1,2-propanediol, 1,3-propanediol, dipropylene glycol, 1,4-butanediol, 1,5-pentanediol, 1,6-hexanediol, 1,8-octanediol, 1,10-decanediol, 1,12-dodecanediol, dimer fatty alcohol, neopentyl glycol, glycerol, 1,1,1-trimethylolpropane, or mixtures of the aforesaid alcohols, with organic dicarboxylic acids or tricarboxylic acids, preferably dicarboxylic acids, or their anhydrides or esters, such as, for example succinic acid, glutaric acid, 3,3-dimethylglutaric acid, adipic acid, suberic acid, sebacic acid, undecanedioic acid, dodecanedicarboxylic acid, azelaic acid, maleic acid, fumaric acid, phthalic acid, dimer fatty acid, isophthalic acid, terephthalic acid, and hexahydrophthalic acid, or mixtures of the aforesaid acids, and also polyester polyols from lactones such as, for example, from ε-caprolactone, also called polycaprolactones.

Particularly suitable polyester polyols, especially crystalline polyester polyols, are polyesters formed from adipic acid, sebacic acid or dodecanedicarboxylic acid as dicarboxylic acid and from hexanediol or neopentyl glycol as dihydric alcohol. Particularly suitable as crystalline polyester polyols are adipic acid/hexanediol polyesters and dodecanedicarboxylic acid/hexanediol polyesters.

Further examples of suitable polyester polyols are polyester polyols of oleochemical origin. Polyester polyols of this kind may be prepared, for example, by complete ring opening of epoxidized triglycerides of a fatty mixture including an at least partially olefinically unsaturated fatty acid, with one or more alcohols having 1 to 12 carbon atoms, and subsequent partial transesterification of the triglyceride derivatives to form alkyl ester polyols having 1 to 12 carbon atoms in the alkyl radical.

Polyester polyols particularly suitable in the context of the present invention are polyester polyols which are crystalline at room temperature and which preferably have an average molecular weight in the range from 1000 to 15 000 g/mol, more particularly 1500 to 8000 g/mol, and very preferably 1700 to 5500 g/mol.

The polyester polyol is usefully incorporated with a content in the range from 5 to 30 wt % and preferably 8 to 22 wt %, based on the total weight of the starting components, in the solvent-free polyurethane hot melt adhesive. It is preferred, moreover, if the solvent-free polyurethane hot melt adhesive of the invention includes only one polyester polyol.

Forming a further constituent of the solvent-free polyurethane hot melt adhesives of the invention is a polyisocyanate. The polyisocyanate may comprise one or more diisocyanates, especially monomeric diisocyanates. Examples of diisocyanates which can be used include aliphatic, cycloaliphatic or aromatic diisocyanates, especially monomeric diisocyanates, with preference being given to aromatic monomeric diisocyanates. The customary diisocyanates available commercially may be used.

A monomeric di- or polyisocyanate differs from isocyanate prepolymers, for example, in particular in containing no urethane groups. Nonmonomeric diisocyanates are, for example, oligomeric or polymeric products of monomeric diisocyanates, such as adducts of monomeric diisocyanates, for example, which are likewise available commercially. It is nevertheless preferred for monomeric diisocyanates to be used.

Examples of monomeric diisocyanates are 1,6-hexamethylene diisocyanate (HDI), 2-methylpentamethylene 1,5-diisocyanate, 2,2,4- and 2,4,4-trimethyl-1,6-hexamethylene diisocyanate (TMDI) and mixtures of these isomers, 1,10-deca-methylene diisocyanate, 1,12-dodecamethylene diisocyanate, lysine diisocyanate and lysine ester diisocyanate, cyclohexane 1,3- and -1,4-diisocyanate and mixtures of these isomers, 1-methyl-2,4- and -2,6-diisocyanatocyclohexane and mixtures of these isomers (HTDI or $H_6TDI$), 1-isocyanato-3,3,5-trimethyl-5-isocyanatomethyl-cyclohexane (=isophorone diisocyanate or IPDI), perhydro-2,4'- and -4,4'-diphenylmethane diisocyanate (HMDI or $H_{12}MDI$) and mixtures of these isomers, 1,4-diisocyanato-2,2,6-trimethylcyclohexane (TMCDI), 1,3- and 1,4-bis(isocyanato-methyl)cyclohexane, m- and p-xylylene diisocyanate (m- and p-XDI) and mixtures of these isomers, m- and p-tetramethyl-1,3- and -1,4-xylylene diisocyanate (m- and p-TMXDI) and mixtures of these isomers, bis(1-isocyanato-1-methylethyl)naphthalene, 2,4- and 2,6-tolylene diisocyanate and mixtures of these isomers (TDI), 4,4'-, 2,4'-, and 2,2'-diphenylmethane diisocyanate and mixtures of these isomers (MDI), 1,3- and 1,4-phenylene diisocyanate and mixtures of these isomers, 2,3,5,6-tetramethyl-1,4-diisocyanatobenzene, naphthalene 1,5-diisocyanate (NDI), 3,3'-dimethyl-4,4'-diisocyanatobiphenyl (TODI), dianisidine diisocyanate (DADI), and also mixtures of the aforesaid isocyanates.

Preferred are MDI, TDI, HDI, and IPDI. Particularly preferred are diphenylmethane diisocyanate (MDI), especially 4,4'-diphenylmethane diisocyanate (4,4'-MDI). The person skilled in the art is aware that the technical products of diisocyanates frequently may include isomer mixtures or other isomers as impurities.

The monomeric diisocyanate has, for example, a molecular weight of not more than 1000 g/mol, preferably not more than 500 g/mol, more preferably not more than 400 g/mol.

The fraction of the polyisocyanate in the solvent-free polyurethane hot melt adhesive of the invention may be in a range from 5 to 40 wt %, but a range from 7 to 20 wt % is preferred, based on the total weight of the starting components.

Besides the aforesaid polyether polyol and polyester polyol, the solvent-free polyurethane adhesives of the invention comprise at least one polyacrylate, which may also be a polymethacrylate. The term poly(meth)acrylate is therefore to be understood hereinafter to refer both to polyacrylates and to polymethacrylates, and also to polymers based on acrylate and methacrylate monomers. It is possible to use one or more polyacrylates and one or more polymethacrylates. Polyacrylates and polymethacrylates are available commercially. A comprehensive representation of polyacrylates and polymethacrylates is found for example in Ullmann's Enzyklopädie der technischen Chemie, Verlag Chemie, $4^{th}$ edition, vol. 19, pp. 7 to 30.

The poly(meth)acrylate is a homopolymer or copolymer of at least one acrylic ester and/or at least one methacrylic ester and optionally further comonomers. A copolymer of acrylic ester is referred to as a polyacrylate, even if it comprises a methacrylic ester as comonomer. The poly (meth)acrylate is preferably a bead polymer.

Acrylic esters and methacrylic esters are, for example, $C_{1-18}$ alkyl acrylates, preferably $C_{1-4}$ alkyl acrylates, and/or $C_{1-18}$ alkyl methacrylates, preferably $C_{1-4}$ alkyl methacrylates. Acrylic esters or methacrylic esters without an additional functional group are preferred. Optionally, however, the acrylic esters and methacrylic esters may also have an additional functional group such as a carboxyl group or hydroxyl group. These esters, however, if used, are in general used together with at least one acrylic ester or methacrylic ester without an additional functional group.

Examples of acrylic esters and methacrylic esters are methyl acrylate, ethyl acrylate, n-butyl acrylate, tert-butyl acrylate, isobutyl acrylate, 2-ethylhexyl acrylate, lauryl acrylate, methyl methacrylate, ethyl methacrylate, and n-butyl methacrylate. Examples of acrylic esters or methacrylic esters with an additional functional group are maleic acid, 2-hydroxyethyl (meth)acrylate, hydroxypropyl (meth)acrylate, butanediol mono(meth)acrylate, esters of (meth)acrylic acid and glycol oligomers and glycol polymers, more particularly propylene glycol oligomers and polymers, and also esters of (meth)acrylic acid and glycol ethers.

Examples of further comonomers optionally employed are styrene, alkylstyrenes, acrylonitrile, vinyl esters such as vinyl acetate and vinyl propionate, vinyl ethers, butadiene, and vinyl chloride. Further optional comonomers which, if employed, are frequently used as auxiliary monomers, i.e., in relatively small amounts, are acrylic acid, methacrylic acid, itaconic acid, maleic acid, fumaric acid, crotonic acid, or their amides.

Preferred polyacrylates or polymethacrylates are copolymers which are obtained by a radical polymerization of one or more acrylic esters and/or methacrylic esters optionally in combination with one or more OH-functional acrylic esters and/or OH-functional methacrylic esters.

The polyacrylate or polymethacrylate is preferably a homopolymer or copolymer of at least one acrylic ester, methacrylic ester, hydroxy-functional acrylic ester, hydroxy-functional methacrylic ester or combination thereof, and also, optionally, of at least one further comonomer, with preferably at least one acrylic ester or methacrylic ester having no additional functional group.

The polyacrylate or polymethacrylate is more preferably a copolymer of methyl methacrylate and n-butyl methacrylate and optionally at least one further comonomer, such as a hydroxy-functional acrylic ester or a hydroxy-functional methacrylic ester, for example.

Suitable polyacrylates or polymethacrylates are available, for example, under the series designation Dynacoll®AC from Evonik.

The polyacrylate or polymethacrylate has, for example, an average molecular weight in a range from 10 000 to 200 000 g/mol, preferably from 20 000 to 150 000 g/mol. In one preferred embodiment the polyacrylate or polymethacrylate comprises at least one polyacrylate or polymethacrylate having a weight-average molecular weight Mw in the range from 30 000 to 300 000 g/mol, more particularly 40 000 to 250 000 g/mol, more preferably 60 000 to 200 000 g/mol, and most preferably 75 000 to 150 000 g/mol. In this context it may be useful if all of the polyacrylates or polymethacrylates present in the polyurethane hot melt adhesive comply with these stipulations. Additionally or alternatively thereto it is preferred if the polyacrylate or polymethacrylate has a glass transition temperature, determined according to ISO 11357-1, in the range from ≥60° C. and especially ≥63° C.

The fraction of the at least one poly(meth)acrylate may be situated, for example, usefully in the range from 12 to 40 wt % and preferably 15 to 30 wt %, based on the total weight of the starting component used for producing the polyurethane hot melt adhesive.

In one particularly preferred embodiment, the solvent-free polyurethane hot melt adhesive comprises at least one poly(meth)acrylate which has a melt flow index of 190° C. in the range from 0.1 to 10 g/10 min. References in the context of this invention to a melt flow index are to the index to be determined in accordance with ISO 1133. A preferred range for the designated poly(meth)acrylate may be stated as a melt flow index in the range from 2 to 9.5 g/10 min.

In a further embodiment, the solvent-free polyurethane hot melt adhesives according to the present invention comprise a poly(meth)acrylate which has a melt flow index at 190° C. of more than 10 g/10 min. Here it is possible to specify a range from 15 to 25 g/10 min as a preferred melt flow index for this poly(meth)acrylate.

As mentioned above, the solvent-free polyurethane hot melt adhesive of the invention comprises one or more fillers selected from kaolin, fumed silica, carbon black or wollastonite. Of the fillers mentioned, kaolin, fumed silica, and carbon black are preferred, it having been observed that wollastonite, if added in relatively high quantities, may adversely affect the thermal stability of the adhesive. Since the use of carbon black as a filler entails the drawback of the inevitable formation of black products, something which is not desirable in all cases, preference among the fillers mentioned is given in particular to kaolin and fumed silica. The most preferred of these fillers is kaolin, it having been observed that it can be incorporated in relatively large fractions into the hot melt composition without adverse changes in the properties of the adhesive. As a result, by means of kaolin it is possible to produce particularly cost-effective hot melt adhesives, since the filler represents the most favorably priced component by comparison with the other constituents for incorporation into the composition.

The fillers stated are incorporated into the solvent-free polyurethane hot melt adhesive of the invention in an amount which brings about a marked improvement in the heat resistance, i.e., an improvement in the heat resistance (determined for an adhesive bond of two wooden substrates) of at least 5° C. and preferably at least 10° C. by comparison with the composition without filler. On the other hand, the amount of filler added ought not to be so great that there is too sharp an increase in the viscosity of the hot melt adhesive composition. The amount of the filler ought preferably to be such that the viscosity of the hot melt adhesive is not more than 50 000 mPa·s and preferably not more than 20 000 mPa·s (determined in each case at 130° C.).

If kaolin is incorporated into the adhesive composition of the invention, its fraction ought to be situated in the range from about 2% to 35%, more particularly in the range from about 5 to 30 wt %, and very preferably in the range from about 10 to 20 wt %. At kaolin fractions of more than 35 wt %, a distinct increase in the viscosity at 130° C. has been observed, adversely affecting the processing properties of corresponding hot melt adhesives. At a fraction of less than 2 wt %, it was not possible to observe a sufficient improvement in the heat stability, and so such small quantities of filler are likewise associated with disadvantages.

If fumed silica is used as a filler, the fraction thereof in the solvent-free polyurethane hot melt adhesive ought to be situated in the range from 0.5 to 3 wt %, preferably 0.5 to 2 wt %. Above 3 wt %, a very sharp increase in viscosity was observed that impairs the usefulness of the adhesive. By comparison with kaolin, it was surprisingly found for fumed silica that in this case a fraction of just 0.5 wt % results in a significant improvement in the heat resistance properties.

If carbon black is incorporated as filler into the hot melt adhesive composition of the invention, its fraction ought usefully to be in the range from 2 to 20 wt %, more particularly 2 to 10 wt %, and very preferably 2 to 5 wt %. At carbon black contents of more than 20 wt % it was observed that the increase in viscosity was too sharp, making such a fraction unfavorable.

If the solvent-free polyurethane hot melt adhesive of the invention includes wollastonite as filler, the fraction thereof ought usefully to be situated in the range from 2 to 8 wt % and more particularly 3 to 5 wt %. At a wollastonite content of approximately 10 wt %, a further improvement was indeed observed in the heat resistance properties, but at the same time the stability of the adhesive on hot storage (16 hours at 140° C.) in the absence of moisture is sharply impaired.

In one embodiment of the present invention, the hot melt adhesive composition of the invention comprises precisely one of the aforementioned fillers, i.e., kaolin, fumed silica, carbon black, or wollastonite. In another embodiment, the hot melt adhesive composition of the invention comprises two or more of the aforementioned fillers.

The reaction of the polyether polyol and of the polyester polyol with the polyisocyanate, preferably with a monomeric diisocyanate, may be carried out, for example, at temperatures in the range from 60 to 160° C., preferably 80 to 140° C. The duration of the reaction is of course dependent on the temperature employed, but may amount, for example, to from 30 min to 6 h, preferably 30 min to 3 h, and more preferably 1 to 1.5 h. For the reaction of polyether polyols and polyester polyols and polyisocyanates it is possible optionally to use customary metal catalysts, as for example Bi catalysts, and also Coscat® 83 from Vertellus Performance Materials, Inc., or Sn catalysts.

For the production of the solvent-free polyurethane hot melt adhesives of the invention, the polyisocyanate is incorporated preferably in an amount so as to set an NCO/OH ratio in the range from 1.5:1 to 3:1 and more preferably 1.8:1 to 2.5:1. In this case, the OH groups are accounted for substantially or exclusively by the aforementioned polyols, in other words, more particularly, the polyester polyols and polyether polyols. The abovementioned NCO/OH ratios are calculated in each case via the molar ratio of isocyanate groups to hydroxyl groups.

It is preferred in the context of the present invention, moreover, if an NCO content of 1 to 5 wt % and preferably 1.8 to 3 wt % is set in the adhesive.

Besides the ingredients mentioned, the solvent-free polyurethane hot melt adhesives of the invention may also include further auxiliaries, although it is preferred if the fraction of these further auxiliaries, if they are used at all, is not more than 10 wt % and preferably not more than 5 wt %, based on the total weight of the polyurethane hot melt adhesive.

Examples of suitable optional auxiliaries are one or more thermoplastic polymers and/or one or more additives. The additives are, for example, selected from catalysts, plasticizers, adhesion promoters, UV absorbers, UV stabilizers and heat stabilizers, antioxidants, flame retardants, optical brighteners, pigments, dyes, and siccatives. Examples of catalysts are catalysts which catalyze the reaction of isocyanate groups with atmospheric moisture.

The optional thermoplastic polymers are preferably inert thermoplastic polymers. Examples are homo- or copolymers of unsaturated monomers, more particularly form the group encompassing ethylene, propylene, butylene, isobutylene, isoprene, vinyl acetate and/or higher esters thereof. Particularly suitable are ethylene vinyl acetate copolymer (EVA), atactic poly-α-olefin (APAO), polypropylene (PP), and polyethylene (PE). The optional thermoplastic polymers do not include any poly(meth)acrylates.

The solvent-free polyurethane hot melt adhesives of the invention comprise isocyanate-terminated polyurethane polymers and/or polyurethane prepolymers. The polyurethane hot melt adhesive of the invention is meltable, meaning that at the application temperature it has a sufficiently low viscosity to enable appropriate application, and on cooling it rapidly becomes solid, allowing it to quickly accommodate forces even before the crosslinking reaction with atmospheric moisture has been concluded. In the context of the present invention, the adhesive with particular preference has a viscosity at 130° C. of ≤50 000 mPa·s and more particularly ≤20 000 mPa·s.

The invention further comprises a method for bonding a first substrate to a second substrate, comprising heating a polyurethane hot melt adhesive of the invention; applying the heated polyurethane hot melt adhesive to the first substrate; contacting the applied polyurethane hot melt adhesive with the second substrate; and chemically curing the polyurethane hot melt adhesive with water, more particularly atmospheric moisture.

The polyurethane hot melt adhesive may be heated, for example, to a temperature in the range from 80° C. to 200° C., more particularly from 120° C. to 160° C.

The first substrate and the second substrate may be made of the same or different material.

To the person skilled in the art it is evident that depending on the system used and on the temperature and reactivity of the adhesive, crosslinking reactions, and hence the chemical curing, may commence even during application. Commonly, however, the major part of the crosslinking and hence the chemical curing in the narrower sense take place after application.

As and when necessary, the first and/or second substrates may be pretreated before the polyurethane hot melt adhesive is applied. Such pretreatments include, in particular, physical and/or chemical cleaning and activating processes, as for example sanding, sandblasting, brushing, corona treatment, plasma treatment, flame treatment, partial etching or the like, or treatment with cleaners or solvents, or the application of an adhesion promoter, an adhesion promoter solution or a primer.

The first and second substrates or their surfaces may be made, for example, of plastic, of organic material such as leather, fabric, paper, wood, resin-bound wood-based material, resin-textile composite material, glass, porcelain, ceramic, and also metal and metal alloy, more particularly painted or powder-coated metal and metal alloy.

Particularly suitable plastics are polyvinyl chloride (PVC), acrylonitrile-butadiene-styrene copolymers (ABS), SMC (sheet molding composites), polycarbonate (PC), polyamide (PA), polyesters (PE), polyoxymethylene (POM), polyolefin (PO), especially polyethylene (PE) or polypropylene (PP), preferably PE or PP surface-treated by plasma, corona or flaming.

Of the first and second substrate, at least one is preferably a plastics film, a textile, or glass. Preferred materials for the first and/or second substrate are transparent materials, more particularly transparent plastics films. Another preferred transparent material is glass, more particularly in the form of a sheet.

The solvent-free polyurethane hot melt adhesive of the invention is suitable more particularly for industrial applications, in vehicle construction, for example, especially in automobile construction; in the textile industry, as a textile adhesive, for example; and in the packaging materials industry, as a film adhesive, for example.

The solvent-free polyurethane hot melt adhesive of the invention is especially suitable for bonds in which the bond site is visible. Hence it is suitable particularly for the bonding of glass, especially in vehicle construction and window construction, and for the bonding of see-through packaging.

The thickness of the adhesive layer formed of the polyurethane hot melt adhesive of the invention is, for example, 10 μm or more, the thickness being situated preferably in the range from 10 to 1000 μm, more preferably from 80 to 500 μm.

The invention also relates to articles bonded by the bonding method of the invention. Such articles are, in particular, articles of the transport industry, more particularly of the automobile industry, furniture industry or textile industry.

Example of bonded articles are interior automobile trim components, such as gutter, sunshield, instrument panel, door side part, parcel shelf, and the like; wood fiber materials from the bath and shower sector; furniture decorative foils, membrane films with textiles such as cotton, polyester films in the apparel sector, or textiles with foams for automotive furnishing. Other examples of bonded articles are articles from the packaging industry, especially a see-through packaging. With particular preference the articles are sandwich panels.

A further aspect of the present invention relates, finally, to the use of the polyurethane hot melt adhesives of the invention for industrial uses, especially in vehicle construction, in the textile industry or in the packaging materials industry.

There now follow examples for further elucidation of the invention, which, however, are not intended to restrict the subject matter of the invention in any way.

EXAMPLES

The following products were used in the trials.

| | | |
|---|---|---|
| Diisocyanate | 4,4'-Diphenylmethylene diisocyanate | BASF |
| Polyether polyol | Linear polypropylene ether polyol, average molecular weight = 2000 g/mol | Bayer |
| Polyester polyol | Crystalline polyester polyol, average molecular weight = 3500 g/mol | Evonik |
| Polymethacrylate A | Methyl methacrylate/n-butyl methacrylate copolymer, Dynacoll AC type 1* | Evonik |
| Polymethacrylate B | Methyl methacrylate/n-butyl methacrylate copolymer, Dynacoll AC type 2* | Evonik |
| Polymethacrylate C | Methyl methacrylate/n-butyl methacrylate copolymer, Dynacoll AC type 3* | Evonik |

*average molecular weight in the range from 20 000 to 150 000 g/mol

Measurement Methods

The moisture-curing hot melt adhesives produced were characterized using the following methods of measurement:

Viscosity

The viscosity was measured at 130° C. using a Rheomat (Brookfield, Thermosel, spindle 27, shear rate 1 min$^{-1}$).

Open Time

The hot melt adhesive was preheated at 150° C. for 30 min. During that period, a bar applicator was placed onto a strip (about 30 cm in length) of Sicol paper. Both were then placed on a hotplate and preheated. At least 20 test strips of the Sicol paper (10 cm×1 cm) were prepared. Once everything was up to temperature, about 20 g of the adhesive were introduced into the bar applicator and used to form a film of about 30 cm with a thickness of about 500 µm. The paper was then immediately removed from the hotplate and placed onto a panel of plywood, preferably beech, which had been conditioned to room temperature (23° C.). Time measurement is commenced at this point in time. Every 10 s a narrow strip of paper was pressed onto the adhesive (slight finger pressure) and then removed again in order to part the two paper strips. As soon as the fracture mode changed from cohesive to partly adhesive, the open time is at an end. This point in time is recorded in seconds.

Initial Strength

The initial strength of the hot melt adhesive was tested with a lap shear wood specimen. The standard wood is beech (Fagus sylvatica) (test specimen: 2 pieces: 100 mm×25 mm×5 mm, thickness of adhesive layer: 1 mm). The initial strength was measured 6, 10, 20 and 30 min after the assembly of the test specimens. The force at fracture of the test specimen was determined at a defined testing speed. Standard conditions: 23° C./50% relative humidity, traverse speed: 10 mm/min The shear strength of the overlap butt τ [MPa] was then determined as per: τ=Fmax/A, in which Fmax=maximum force, A=bond area Heat Resistance The heat resistance was determined using wooden test specimens with dimensions of 1.5 cm×1.5 cm, by applying the compositions with a layer thickness of 1 mm to the first test specimen and then bringing that test specimen into contact with the second test specimen. Following complete curing, the test specimen was loaded with a weight of 1 kg in a lap shear testing apparatus. The temperature for this purpose was initially set at about 40° C. below the anticipated heat resistance level, and was then increased by 10° C. at intervals of 1 h. The temperature (in ° C.) at which the test specimen underwent failure in the lap shear test was taken as the heat resistance of the composition.

Stability

The stability of the adhesive was determined via the viscosity of the adhesive, as the increase in % after storage at 140° C. for 16 h (in the absence of moisture). A viscosity increase of more than 150% was considered unacceptable.

Tensile Strength and Elongation at Break

Proceeding in accordance with DIN 53504, five rectangular test specimens measuring 2.5×10 cm were cut out of a 500 µm thick cured film (cured for 7 days at 23° C./50% RH) of the sample. These test specimens were clamped into the tensile testing machine (Zwick Z 020) and pulled apart at a speed of 100 mm/min (test conditions 23° C./50% RH). A measurement was made of the maximum tensile force absorbed by the sample. This was used to determine tensile strength and elongation at break, with each being averaged over the five test specimens.

Example 1

In accordance with the trial description below, various polyurethane hot melt adhesives were produced with different quantities of kaolin. This was done by introducing a polyether/polyacrylate mixture, in the quantities indicated in table 1, in a 1-liter reaction vessel with nonstick coating and a 4-neck lid 25 with ground connections. Mixing took place in an oil bath with temperature control at 160° C. for 2 hours. The resulting liquid polyol mixture was mixed with polyester polyol and dewatered under a high vacuum at 140° C. with stirring for an hour. Then MDI in an NCO/OH molar ratio of 2.2:1 to the polyol mixture was added to the reaction vessel and reaction was carried out with stirring for 1 hour with the temperature maintained (140° C.). At the end, the filler (kaolin) was added and was homogenized with the product mixture with stirring. The reaction product formed was kept at room temperature in the absence of moisture.

The quantity fractions used in these examples are reported in table 1 below. The hot melt adhesives obtained were investigated by the measurement methods stated. The results are likewise shown in table 1.

TABLE 1

|  | Ref. 1 | 1 | 2 | 3 | 4 | 5 |
|---|---|---|---|---|---|---|
| Ingredients |  |  |  |  |  |  |
| Polyether polyol | 36.8 | 36.0 | 34.9 | 29.4 | 25.7 | 22.1 |
| Polyester polyol | 21.6 | 21.2 | 20.6 | 17.3 | 15.2 | 13.0 |
| Polymethacrylate A | 2.4 | 2.4 | 2.3 | 2.0 | 1.7 | 1.4 |
| Polymethacrylate B | 15.2 | 14.8 | 14.4 | 12.1 | 10.6 | 9.1 |
| Polymethacrylate C | 10.5 | 10.3 | 10 | 8.4 | 7.3 | 6.3 |
| Kaolin |  | 2 | 10 | 20 | 30 | 40 |
| Diisocyanate | 13.5 | 13.3 | 12.9 | 10.8 | 9.5 | 8.1 |
| Properties |  |  |  |  |  |  |
| Viscosity [mPa · s] | 17 300 | 14 900 | 20 600 | 35 500 | 96 200 (2.5 rpm) | n.m. |
| Open time [sec] | 45 | 30 (residual tack) | 45 | 30 (almost tack-free after 50 sec) |  |  |
| Initial strength 30 min [MPa] | 0.39 | 0.39 | 0.34 | 0.562 | 0.6 |  |
| Heat resistance [° C.] | 160 | 180 | 180 | 196 | 198 |  |
| Stability [viscosity increase in %] | <10 | 15 | 100 | <10 |  |  |
| Elongation at break [%] | 220 | 224 | 190 | 160 |  |  |
| Tensile strength [N/mm²] | 7.2 | 7.54 | 7.4 | 9.4 |  |  | n.m. = not measurable

In the examples it is apparent that through addition of kaolin in a quantity range from 2 to 30 wt % it is possible to achieve a substantially improved heat resistance and improved tensile strengths of the adhesives. At kaolin levels of 30 wt %, however, a significantly increasing viscosity was observed, which adversely affects the processing properties of the adhesives.

Example 2

In the following examples, different fillers are investigated as additives to the hot melt adhesives of the invention (samples 6 to 9). Additionally, adhesives were investigated which instead of a polyacrylate mixture contained only a polyacrylate of type B (samples 10 to 12). The quantity fractions used in these examples are reported in table 2 below. The hot melt adhesives obtained were investigated using the measurement methods stated. The results are likewise shown in table 2.

In the investigations it was apparent that all the fillers investigated give the adhesives improved heat resistance and improved tensile strengths. In the case of corresponding investigations with a 5 wt % fumed silica, 27 wt % carbon black or 10 wt % wollastonite content, conversely, either unstable adhesives or very high viscosities were obtained, and so these formulations were less suitable as an adhesive. Similarly, when using fillers such as mica, nanoclay, chalk or talc, improved heat resistance properties were indeed observed, but the corresponding adhesives cured fully during hot storage at 140° C. for 16 h in spite of the exclusion of moisture, meaning that with these fillers it was not possible to realize adhesives with long-term durability.

TABLE 2

|  | 2 | 6 | 7 | 8 | 9 | Ref 2 | 10 | 11 | 12 |
|---|---|---|---|---|---|---|---|---|---|
| Ingredients |  |  |  |  |  |  |  |  |  |
| Polyether polyol | 34.9 | 36.6 | 36.0 | 36.0 | 34.0 | 36.8 | 33.1 | 29.4 | 25.8 |
| Polyester polyol | 20.6 | 21.5 | 21.2 | 21.2 | 20.0 | 21.6 | 19.4 | 17.3 | 15.2 |
| Polymethyl acrylate A | 2.3 | 2.4 | 2.4 | 2.4 | 2.2 |  |  |  |  |
| Polymethyl acrylate B | 14.4 | 15.7 | 14.8 | 14.8 | 14.0 | 28.1 | 25.2 | 22.4 | 19.6 |
| Polymethyl acrylate C | 10 | 10.4 | 10.3 | 10.3 | 9.7 |  |  |  |  |
| Kaolin | 10 |  |  |  |  |  | 10 | 20.0 | 30.0 |
| Fumed silica |  | 0.5 |  |  |  |  |  |  |  |
| Carbon black |  |  | 2.0 |  |  |  |  |  |  |
| Wollastonite |  |  |  | 2.0 | 7.6 |  |  |  |  |
| Diisocyanate | 12.9 | 13.5 | 13.3 | 13.3 | 12.5 | 13.5 | 12.2 | 10.8 | 9.4 |
| Properties |  |  |  |  |  |  |  |  |  |
| Viscosity [mPa · s] | 20 600 | 18 000 | 18 100 | 12 900 | 18 000 | 5000 | 8600 | 17 200 | 54 200 |
| Open time [sec] | 45 | 40 (residual tack) | 45 | 30 (residual tack) | 30 (residual tack) | 80 | 60 (residual tack) | 30 (residual tack) |  |
| Initial strength 30 Min [MPa] | 0.34 | 0.2 | 0.34 | 0.4 | 0.36 | 0.08 | 0.1 | 0.23 | 0.5 |
| Heat resistance [° C.] | 180 | 180 | 180 | 180 | 180 | 170 | 182 | 190 | 192 |
| Stability [viscosity increase in %] | 100 | 130 | −10 | 13 | 103 | 15 | <10 | <10 |  |
| Elongation at break [%] | 190 | 270 | 260 | 345 | 199 | 537 | 474 | 420 |  |
| Tensile strength [N/mm²] | 7.4 | 8.5 | 7.45 | 10.4 | 7.77 | 8.61 | 8.97 | 10.9 |  |

The invention claimed is:

1. A solvent-free polyurethane hot melt adhesive comprising:
   one or more fillers selected from the group consisting of kaolin, fumed silica, carbon black, and wollastonite, and
   a reaction product obtained by reacting:
      (i) a composition comprising:
         a polyether polyol,
         a polyester polyol, and
         at least one poly(meth)acrylate, wherein an amount of the at least one poly(meth)acrylate is in a range of from 26.7 to 40 wt %, based on a total weight of starting components for producing the polyurethane hot melt adhesive, with
      (ii) a polyisocyanate, wherein the polyisocyanate is incorporated into the polyurethane hot melt adhesive in an amount so as to establish a 1.8:1 to 3:1 NCO/OH ratio.

2. The solvent-free polyurethane hot melt adhesive of claim 1, wherein the filler is kaolin or fumed silica.

3. The solvent-free polyurethane hot melt adhesive of claim 2, wherein kaolin is present in an amount in the range from 2% to 35%.

4. The solvent-free polyurethane hot melt adhesive of claim 1, wherein the polyether polyol is a polyalkylene oxide polyol having an average molecular weight Mn in the range from 1000 to 8000 g/mol.

5. The solvent-free polyurethane hot melt adhesive of claim 4, wherein the polyether polyol is polypropylene ether polyol.

6. The solvent-free polyurethane hot melt adhesive of claim 1, wherein the polyether polyol is incorporated at a content of from 15 to 45 wt % into the polyurethane hot melt adhesive.

7. The solvent-free polyurethane hot melt adhesive of claim 1, wherein the polyester polyol is a polyester polyol which is crystalline at room temperature.

8. The solvent-free polyurethane hot melt adhesive of claim 1, wherein the polyester polyol is incorporated at a content of from 5 to 30 wt % into the polyurethane hot melt adhesive.

9. The solvent-free polyurethane hot melt adhesive of claim 1, wherein the at least one poly(meth)acrylate has a melt flow index at 190° C. in the range from 0.1 to 10 g/10 min determined according to DIN ISO 1133.

10. The solvent-free polyurethane hot melt adhesive of claim 1, wherein the at least one poly(meth)acrylate has a melt flow index at 190° C. of more than 10 g/10 min determined according to DIN ISO 1133.

11. The solvent-free polyurethane hot melt adhesive of claim 1, wherein the polyisocyanate comprises MDI.

12. The solvent-free polyurethane hot melt adhesive of claim 1, wherein kaolin is present in an amount in the range from 5% to 30%.

13. The solvent-free polyurethane hot melt adhesive of claim 1, wherein kaolin is present in an amount in the range from 10% to 20%.

14. The solvent-free polyurethane hot melt adhesive of claim 1, wherein the polyisocyanate is incorporated into the polyurethane hot melt adhesive in an amount so as to establish a 1.8:1 to 2.5:1 NCO/OH ratio.

15. The solvent-free polyurethane hot melt adhesive of claim 1, wherein the at least one poly(meth)acrylate is a copolymer formed from methyl methacrylate and n-butyl methacrylate.

16. The solvent-free polyurethane hot melt adhesive of claim 1, wherein the at least one poly(meth)acrylate has an average molecular weight in a range of from 75,000 to 300,000 g/mol.

17. A method for bonding a first substrate to a second substrate, comprising heating a solvent-free polyurethane hot melt adhesive as claimed in claim 1, applying the heated polyurethane hot melt adhesive to the first substrate; contacting the applied polyurethane hot melt adhesive with the second substrate; and chemically curing the polyurethane hot melt adhesive with water.

18. An article bonded by a method as claimed in claim 17, the article being a sandwich panel.

* * * * *